US012436484B2

(12) United States Patent
Sugiura et al.

(10) Patent No.: US 12,436,484 B2
(45) Date of Patent: Oct. 7, 2025

(54) INTERMEDIATE TRANSFER BELT, TRANSFER DEVICE, AND IMAGE FORMING APPARATUS

(71) Applicant: FUJIFILM Business Innovation Corp., Tokyo (JP)

(72) Inventors: Satoya Sugiura, Kanagawa (JP); Hiroaki Tanaka, Kanagawa (JP); Masato Furukawa, Kanagawa (JP); Ryosuke Kubota, Kanagawa (JP); Yosuke Kubo, Kanagawa (JP); Shigeru Fukuda, Kanagawa (JP); Daisuke Tanemura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/733,824

(22) Filed: Jun. 4, 2024

(65) Prior Publication Data

US 2025/0013174 A1 Jan. 9, 2025

(30) Foreign Application Priority Data

Jun. 30, 2023 (JP) ................................ 2023-108943

(51) Int. Cl.
*G03G 15/16* (2006.01)

(52) U.S. Cl.
CPC ......... *G03G 15/162* (2013.01); *G03G 15/161* (2013.01)

(58) Field of Classification Search
CPC .......................... G03G 15/161; G03G 15/162
See application file for complete search history.

(56) References Cited

U.S. PATENT DOCUMENTS

| | | | | |
|---|---|---|---|---|
| 2003/0044203 | A1* | 3/2003 | Watanabe ............ | G03G 15/161 399/302 |
| 2015/0370199 | A1* | 12/2015 | Kojima ................ | G03G 15/162 428/411.1 |
| 2019/0369529 | A1* | 12/2019 | Yagi ................... | G03G 9/08797 |
| 2021/0373463 | A1* | 12/2021 | Kasai ................... | G03G 15/162 |

FOREIGN PATENT DOCUMENTS

| | | |
|---|---|---|
| JP | 2001305879 | 11/2001 |
| JP | 2015106138 | 6/2015 |

* cited by examiner

*Primary Examiner* — Carla J Therrien
(74) *Attorney, Agent, or Firm* — JCIPRNET

(57) ABSTRACT

An intermediate transfer belt includes a resin, conductive carbon particles, and an alkyl silicone oil and a modified body thereof, in which regions different in a content of the alkyl silicone oil and the modified body thereof are formed on an outer peripheral surface, in a case where a silicon amount (Atomic %) on the outer peripheral surface is measured along an axial direction using an X-ray photoelectron spectroscopy, the silicon amount is periodically increased and decreased along the axial direction, and a peak-to-peak distance in an increasing/decreasing period of the silicon amount is 0.1 mm or more and 5.0 mm or less.

18 Claims, 3 Drawing Sheets

INTERMEDIATE TRANSFER BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2023-108943 filed Jun. 30, 2023.

BACKGROUND

(i) Technical Field

The present disclosure relates to an intermediate transfer belt, a transfer device, and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed. For the transfer of the toner image to the recording medium, for example, a transfer device including a conductive intermediate transfer belt such as an intermediate transfer belt is used.

For example, JP2001-305879A discloses an image forming apparatus including a recording material carrying body that carries and transports a recording material, an image forming unit that forms a toner image on the recording material carried by the recording material carrying body, and a cleaning unit that cleans the recording material carrying body, in which the cleaning unit includes a cleaning blade, and in a case where a contact pressure of the cleaning blade to the recording material carrying body is set to 15 g/cm or more and 100 g/cm or less, the recording material carrying body is used such that an initial surface roughness Rz of the recording material carrying body is 0.01 μm or more and 1.0 μm or less, and an average surface roughness Rz after 10,000 rotations in actual apparatus operation is 0.01 μm or more and 1.5 μm or less.

JP2015-106138A discloses an image forming apparatus including an image carrier that carries and transports a toner image directly or via a transfer material, and a cleaning member that is brought into contact with a surface of the image carrier and that rubs the surface of the moving image carrier to scrape off the toner from the surface of the image carrier, in which a lubricant is added to a surface layer that forms the surface of the image carrier, grooves are formed on the surface of the image carrier along a moving direction of the surface of the image carrier, and in a case where an average particle size of the lubricant is denoted by d and a depth of projecting valley portion of the surface of the image carrier, which is measured in a direction substantially orthogonal to the moving direction of the surface of the image carrier, is denoted by Rvk, a relationship of d>Rvk is satisfied.

SUMMARY

Aspects of non-limiting embodiments of the present disclosure relate to an intermediate transfer belt that includes a resin, conductive carbon particles, an alkyl silicone oil and a modified body thereof, in which regions different in a content of the alkyl silicone oil and the modified body thereof are formed on an outer peripheral surface, in a case where a silicon amount (Atomic %) on the outer peripheral surface is measured along an axial direction using an X-ray photoelectron spectroscopy, the silicon amount is periodically increased and decreased along the axial direction, and as compared with the case where a peak-to-peak distance in an increasing/decreasing period of the silicon amount is less than 0.1 mm or more than 5.0 mm, a curling of the blade that is brought into contact with the outer peripheral surface of the intermediate transfer belt to clean the outer peripheral surface is suppressed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The above-described object is achieved by the following aspects.

According to an aspect of the present disclosure, there is provided an intermediate transfer belt including a resin, conductive carbon particles, and an alkyl silicone oil and a modified body thereof, in which regions different in a content of the alkyl silicone oil and the modified body thereof are formed on an outer peripheral surface, in a case where a silicon amount (Atomic %) on the outer peripheral surface is measured along an axial direction using an X-ray photoelectron spectroscopy, the silicon amount is periodically increased and decreased along the axial direction, and a peak-to-peak distance in an increasing/decreasing period of the silicon amount is 0.1 mm or more and 5.0 mm or less.

BRIEF DESCRIPTION OF THE DRAWINGS

Exemplary embodiment(s) of the present invention will be described in detail based on the following figures, wherein.

DETAILED DESCRIPTION

Figure 1:
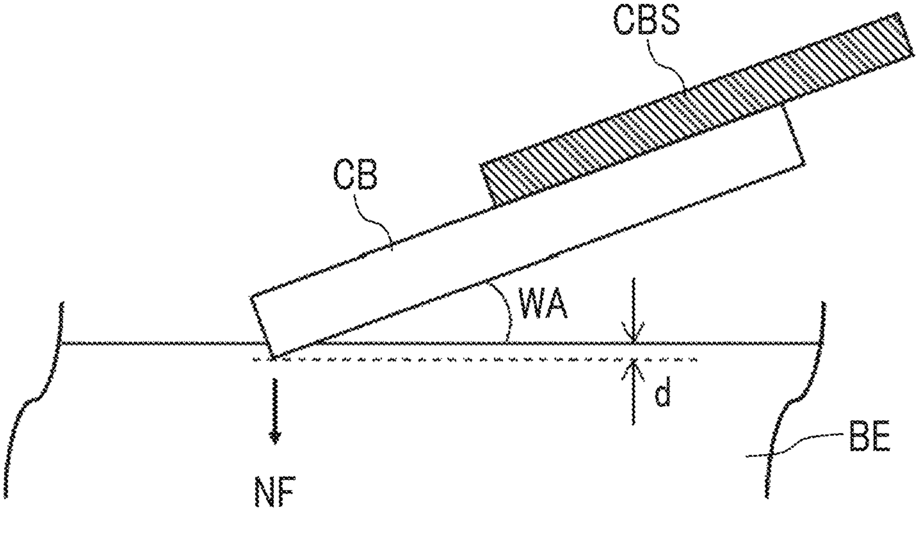
FIG. 1 is a schematic view describing a condition of contact between an intermediate transfer belt according to the present exemplary embodiment and a blade.

The present exemplary embodiment will be described below. The description and examples of these exemplary embodiments illustrate the exemplary embodiments and do not limit the scopes of the exemplary embodiments.

Regarding the ranges of numerical values described in stages in the present exemplary embodiment, the upper limit value or lower limit value described in one range of numerical values may be replaced with the upper limit value or lower limit value of another range of numerical values described in stages. In addition, regarding the ranges of numerical values described in the present exemplary embodiment, the upper limit value or lower limit value of a range of numerical values may be replaced with values described in examples.

In the present exemplary embodiment, the term "step" includes not only an independent step but also a step that cannot be clearly distinguished from other steps but can achieve the expected object thereof.

In the present exemplary embodiment, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Intermediate Transfer Belt

The intermediate transfer belt according to the present exemplary embodiment is an intermediate transfer belt includes a resin, conductive carbon particles, and an alkyl silicone oil and a modified body thereof, in which regions different in a content of the alkyl silicone oil and the modified body thereof are formed on an outer peripheral surface, in a case where a silicon amount (Atomic %) on the outer peripheral surface is measured along an axial direction using an X-ray photoelectron spectroscopy, the silicon amount is periodically increased and decreased along the axial direction, and a peak-to-peak distance in an increasing/decreasing period of the silicon amount is 0.1 mm or more and 5.0 mm or less.

The outer peripheral surface refers to a surface on which a toner image is transferred. In addition, the "alkyl silicone oil and modified body thereof" is also collectively referred to as the "alkyl silicone oil".

In the intermediate transfer belt, a configuration is known in which an outer peripheral surface thereof is made to be high mold releasability to improve a transfer efficiency. However, in a case where the outer peripheral surface is simply made to be high mold releasability, a curling may occur in the blade that is brought into the contact with the outer peripheral surface of the intermediate transfer belt to clean the outer peripheral surface. This is presumed to be because, by the improvement of the transfer efficiency, the residual toner or the like entering the contact portion between the outer peripheral surface of the intermediate transfer belt and the blade is reduced, and thus the lubrication at such contact portion is insufficient and the operation of the edge portion of the blade is unstable.

As described above, the intermediate transfer belt according to the present exemplary embodiment contains an alkyl silicone oil having high mold releasability. Therefore, the non-electrostatic adhesion force of the toner to the outer peripheral surface of the intermediate transfer belt is reduced, and the toner is easily peeled off from the intermediate transfer belt. As a result, the intermediate transfer belt according to the present exemplary embodiment has a high transfer efficiency.

Furthermore, the intermediate transfer belt according to the present exemplary embodiment has a configuration in which, on the outer peripheral surface, regions different in a content of the alkyl silicone oil are formed, and in a case where the silicon amount (Atomic %) on the outer peripheral surface is measured along the axial direction using X-ray photoelectron spectroscopy (XPS), the silicon amount is periodically increased and decreased along the axial direction, and a peak-to-peak distance in an increasing/decreasing period of the silicon amount is 0.1 mm or more and 5.0 mm or less. In this configuration, since there is a portion where the alkyl silicone oil is abundant and a portion where the alkyl silicone oil is scarce on the outer peripheral surface, the residual toner or the like is appropriately allowed to enter the contact portion between the outer peripheral surface of the intermediate transfer belt and the blade, the friction of the edge portion of the blade can be reduced, and further, the operation of the edge portion of the blade can be stabilized. As a result, it is presumed that the curling of the blade can be suppressed. In addition, it is presumed that the cleanliness of the outer peripheral surface is also improved because the operation of the edge portion of the blade is stabilized and the curling of the blade is suppressed.

Hereinafter, the "curling of the blade that is brought into contact with the outer peripheral surface of the intermediate transfer belt to clean the outer peripheral surface" is simply referred to as "curling of the blade".

Aspects

Hereinafter, an aspect of the intermediate transfer belt according to the present exemplary embodiment will be described.

In the intermediate transfer belt according to the present exemplary embodiment, from the viewpoint of further suppressing the curling of the blade, the peak-to-peak distance in the increasing/decreasing period of the silicon amount is, for example, preferably 0.1 mm or more and 3.0 mm or less and more preferably 1.0 mm or more and 3.0 mm or less.

In the intermediate transfer belt according to the present exemplary embodiment, from the viewpoint of further suppressing the curling of the blade, the difference between the peak top and the peak bottom in the increasing/decreasing period of the silicon amount is, for example, preferably 0.1 Atomic % or more and 5.0 Atomic % or less and more preferably 0.5 Atomic % or more and 5.0 Atomic % or less.

In the intermediate transfer belt according to the present exemplary embodiment, from the viewpoint of further suppressing the curling of the blade, for example, it is preferable that the peak-to-peak distance in the increasing/decreasing period of the silicon amount is 0.1 mm or more and 3.0 mm or less and the difference between the peak top and the peak bottom in the increasing/decreasing period of the silicon amount is 0.1 Atomic % or more and 5.0 Atomic % or less.

Here, a measuring method of the silicon amount using an X-ray photoelectron spectroscopy (XPS), and a method of obtaining the peak-to-peak distance in an increasing/decreasing period of the silicon amount, and a difference between the peak top and the peak bottom in the increasing/decreasing period of the silicon amount will be described.

In the measurement of the silicon amount by XPS, for example, JPS-9000MX manufactured by JEOL Ltd. is used, the cumulative value of the magnitude of the peak of the element detected by the wide scanning with an acceleration voltage of 10 kV, an emission current of 10 mA, and a measurement energy of 0 to 1100 eV is defined as 100%, and a peak ratio of each element is defined as Atomic % of each element. The silicon amount is defined by a Si 2p 3/2 peak appearing in the vicinity of 102 eV. Typically, the measurement in the belt axial direction is performed by moving the belt in the axial direction by 0.1 mm and repeating the same measurement.

Figure 3:
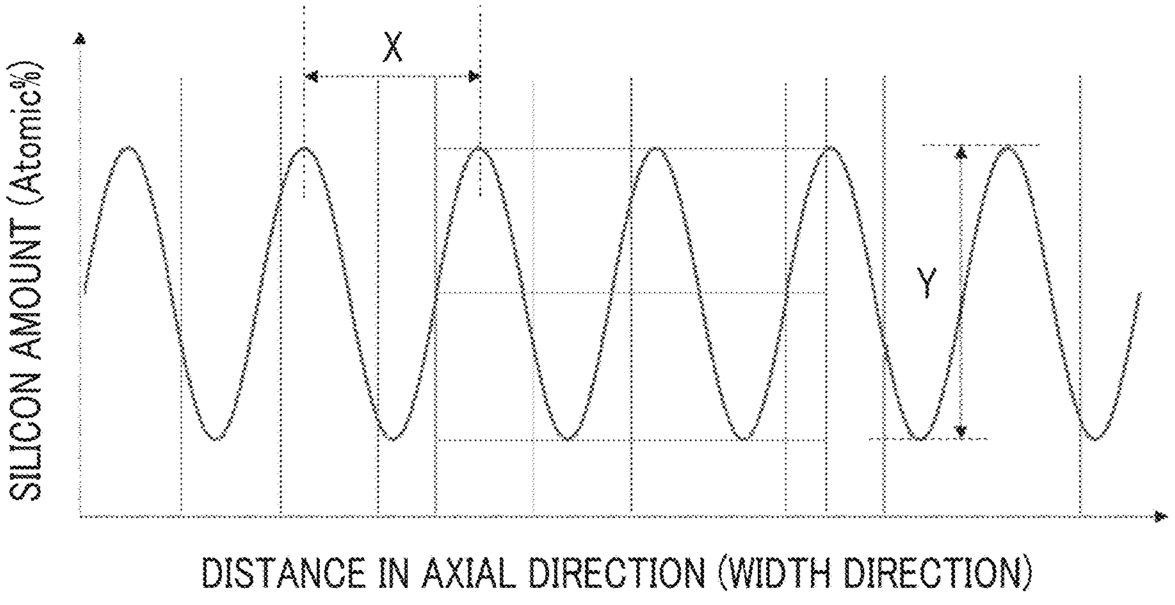
FIG. 3 is a graph for describing an increasing/decreasing period of the silicon amount on the outer peripheral surface of the intermediate transfer belt according to the present exemplary embodiment.

In the intermediate transfer belt according to the present exemplary embodiment, in a case where the silicon amount of the outer peripheral surface is measured by the above-described method and the relationship between the measured silicon amount and the distance of the outer peripheral surface of the intermediate transfer belt in the axial direction (width direction) is shown in a graph, as shown in FIG. 3, periodic increase and decrease of the silicon amount are observed.

Here, FIG. 3 is a graph for describing an increasing/decreasing period of the silicon amount on the outer peripheral surface of the intermediate transfer belt according to the present exemplary embodiment, in which the vertical axis indicates the silicon amount and the horizontal axis indicates the distance of the outer peripheral surface of the intermediate transfer belt in the axial direction (width direction).

As shown in FIG. 3, the peak-to-peak distance in the increasing/decreasing period of the silicon amount is obtained as an average value for 10 points of adjacent peak-to-peak distances X in the increasing/decreasing period of the silicon amount.

In addition, as shown in FIG. 3, the difference between the peak top and the peak bottom in the increasing/decreasing period of the silicon amount is obtained as an average value for 10 points of differences Y between adjacent peak top and peak bottom.

In the intermediate transfer belt according to the present exemplary embodiment, a difference between the surface resistivity at the peak top portion and the surface resistivity at the peak bottom portion in the increasing/decreasing period of the silicon amount is, for example, preferably 0.03 log Ω/□ or less, and more preferably 0.02 log Ω/□ or less.

The difference between the surface resistivity at the peak top portion and the surface resistivity at the peak bottom portion in the increasing/decreasing period of the silicon amount is preferably smaller, and for example, most preferably 0.

In the intermediate transfer belt according to the present exemplary embodiment, from the viewpoint of suppressing unevenness of image quality, for example, even in a case where regions different in the content of the alkyl silicone oil are formed on the outer peripheral surface, the difference in surface resistivity is preferably small as described above. In a case where regions different in the content of the alkyl silicone oil are formed on the outer peripheral surface, it is considered that in the intermediate transfer belt, there are two paths of conduction mechanisms, the charge held by the alkyl silicone oil on the outer peripheral surface and the charge transmitted through the interface between the alkyl silicone oil and the belt base (resin component). The surface resistivity of such an intermediate transfer belt is obtained from the sum in the above-described two conduction mechanisms of charges, and it is considered that the contribution of the latter charge transmitted through the interface is particularly large. From this, it is presumed that, in the intermediate transfer belt according to the present exemplary embodiment, even in a case where the regions different in the content of the alkyl silicone oil are formed on the outer peripheral surface, the difference in surface resistivity is small. Thus, in the intermediate transfer belt according to the present exemplary embodiment, since the difference in surface resistivity of the outer peripheral surface is small, the transfer efficiency can also be increased.

Here, a measuring method of the surface resistivity of the belt will be described.

From the viewpoint of improving transferability, the common logarithm value of the surface resistivity that the intermediate transfer belt has in a case where a voltage of 500 V is applied to the outer peripheral surface thereof for 10 seconds is, for example, preferably 9.5 (log Ω/sq.) or more 15.0 (log Ω/sq.) or less, more preferably 10.0 (log Ω/sq.) or more and 14.0 (log Ω/sq.) or less, and particularly preferably 11.0 (log Ω/sq.) or more and 13.5 (log Ω/sq.) or less.

The log Ω/sq. of the surface resistivity represents the surface resistivity using the logarithm value of the resistance value per area, which is also written as log(Q/sq.), log Ω/square, log Ω/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/sq.) of the outer peripheral surface of the intermediate transfer belt is measured, by continuously scanning with a probe in the width direction at six spots at equal intervals in the circumferential direction, at a voltage of 500 V under a pressure of 1 kgf for a voltage application time of 10 seconds, and the average value thereof is calculated. The surface resistivity is measured in an environment of a temperature of 22° C. and a humidity of 55% RH.

Configuration of Intermediate Transfer Belt

The intermediate transfer belt according to the present exemplary embodiment contains a resin, conductive carbon particles, and an alkyl silicone oil and a modified body thereof and may be a single layer body or a laminate as long as the outer peripheral surface has the above-described configuration.

In a case where the intermediate transfer belt is a single layer body, such single layer body includes a resin, conductive carbon particles, an alkyl silicone oil and a modified body thereof, and the outer peripheral surface thereof may have the above-described configuration.

In addition, in a case where the intermediate transfer belt is a laminate, such laminate preferably has, for example, a substrate layer and a surface layer which is an outermost layer provided on the substrate layer. The laminate may have another layer between the substrate layer and the surface layer. In a case where the intermediate transfer belt is a laminate having a substrate layer and a surface layer, for example, it is preferable that the surface layer contains a resin, conductive carbon particles, an alkyl silicone oil and a modified body thereof, and the outer peripheral surface thereof has the above-described configuration. The substrate layer in this case may include a resin, conductive carbon particles, an alkyl silicone oil and a modified body thereof, or may have a configuration in which the substrate layer contains a resin and conductive carbon particles, but does not contain an alkyl silicone oil and a modified body thereof. In addition, the surface layer may be formed on the entire surface of the substrate layer, or may be partially formed. Furthermore, the resins, the conductive carbon particles, and the alkyl silicone oil and a modified body thereof, which are contained in the substrate layer and the surface layer, may be the same as or different from each other.

Resin

Examples of the resin contained in the intermediate transfer belt according to the present exemplary embodiment include a polyimide resin, a polyamide-imide resin, an aromatic polyether ketone resin, a polyphenylene sulfide resin, a polyetherimide resin, a polyester resin, a polyamide resin, a polycarbonate resin, and the like.

Polyimide Resin

Examples of the polyimide resin include an imidized polyamic acid (polyimide resin precursor) which is a polymer of a tetracarboxylic dianhydride and a diamine compound.

Examples of the polyimide resin include a resin having a constitution represented by General Formula (I).

General Formula (I)

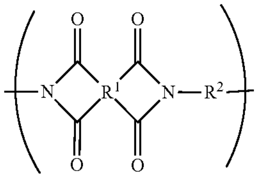

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these groups. Specific examples of the tetravalent organic group include a residue of a tetracarboxylic dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these groups. Specific examples of the divalent organic group include a residue of a diamine compound which will be described later.

Specifically, examples of the tetracarboxylic dianhydride used as a raw material of the polyimide resin include a pyromellitic dianhydride, a 3,3',4,4'-benzophenone tetracarboxylic dianhydride, a 3,3',4,4'-biphenyltetracarboxylic dianhydride, a 2,3,3',4-biphenyltetracarboxylic dianhydride, a 2,3,6,7-naphthalenetetracarboxylic dianhydride, a 1,2,5,6-naphthalenetetracarboxylic dianhydride, a 1,4,5,8-naphthalenetetracarboxylic dianhydride, a 2,2'-bis(3,4-dicarboxyphenyl)sulfonic dianhydride, a perylene-3,4,9,10-Tetracarboxylic dianhydride, a bis(3,4-dicarboxyphenyl) ether dianhydride, and an ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(3-amino tert-butyl)toluene, bis(p-p-amino-tert-butylphenyl)ether, bis (p-p-methyl-6-aminophenyl)benzene, bis-p-(1,1-dimethyl-5-amino-pentyl)benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl] propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Polyamide-Imide Resin

Examples of the polyamide-imide resin include a resin having an imide bond and an amide bond in a repeat.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof are preferable. In addition to the tricarboxylic acid, a tetracarboxylic dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

Aromatic Polyether Ether Ketone Resin

Examples of the aromatic polyether ether ketone resin include a resin in which aromatic rings such as benzene rings are linearly bonded to each other by ether bonds and ketone bonds that are arranged in order of an ether bond, an ether bond, and a ketone bond.

Polyphenylene Sulfide Resin

Examples of the polyphenylene sulfide resin include a resin in which a group having a benzene ring and a sulfur atom are alternately bonded to each other.

Examples of the group having a benzene ring include p-phenylene, m-phenylene, o-phenylene, alkyl-substituted phenylene, phenyl-substituted phenylene, halogen-substituted phenylene, amino-substituted phenylene, amide-substituted phenylene, and the like.

Polyetherimide Resin

Examples of the polyetherimide resin include a polymer of an aromatic bis(etherdicarboxylic) acid and a diamine.

Examples of the aromatic bis(etherdicarboxylic) acid include 2,2-bis[4-(2,3-dicarboxyphenoxy)phenyl]propane, 2,2-bis[4-(3,4-dicarboxyphenoxy)phenyl]propane, and the like.

Examples of the diamine include 4,4'-diaminodiphenylmethane, metaphenylenediamine, and the like.

Among these, as the resin contained in the intermediate transfer belt, for example, an imide-based resin such as a polyimide resin, a polyamide-imide resin, and a polyetherimide resin is preferable, and at least one selected from the group consisting of a polyimide resin and a polyamide-imide resin is more preferably contained, and a polyimide resin is still more preferably contained.

In addition, the resin contained in the intermediate transfer belt may be only one type or two or more types.

In the intermediate transfer belt that is a single layer body, from the viewpoints of mechanical strength, volume resistivity adjustment, and the like, the content of the resin in the single layer body is, for example, preferably 48% by mass or more and 91% by mass or less, more preferably 55% by mass or more and 89% by mass or less, and still more preferably 65% by mass or more and 84% by mass or less.

In the intermediate transfer belt that is a laminate, from the viewpoints of mechanical strength, volume resistivity adjustment, and the like, the content of the resin in the surface layer is, for example, preferably 48% by mass or more and 91% by mass or less, more preferably 55% by mass or more and 89% by mass or less, and still more preferably 65% by mass or more and 84% by mass or less.

In the intermediate transfer belt that is a laminate, from the viewpoints of mechanical strength, volume resistivity adjustment, and the like, the content of the resin in the substrate layer is, for example, preferably 60% by mass or more and 95% by mass or less, more preferably 70% by mass or more and 90% by mass or less, and still more preferably 70% by mass or more and 80% by mass or less.

Conductive Carbon Particles

Examples of the conductive carbon particles contained in the intermediate transfer belt according to the present exemplary embodiment include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, a hydroxy group, or the like to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

Examples of the number-average primary particle size of the conductive carbon particles include 2 nm or more and 40 nm or less, and from the viewpoints of dispersibility, mechanical strength, volume resistivity, film forming properties, and the like, for example, 8 nm or more and 30 nm or less is preferable.

In a case where the intermediate transfer belt according to the present exemplary embodiment is a laminate, for example, it is preferable that the number-average primary particle size of the conductive carbon particles contained in the surface layer is smaller than the number-average primary particle size of the conductive carbon particles contained in the substrate layer.

The number-average primary particle size of the conductive carbon particles is measured by the following method.

First, by a microtome, a measurement sample having a thickness of 100 nm is collected from each layer of the obtained belt and observed with a transmission electron microscope (TEM). Then, the diameters of circles each having an area equivalent to the projected area of each of 50 conductive carbon particles (that is, equivalent circle diameters) are adopted as particle sizes, and the average thereof is adopted as the number-average primary particle size.

In addition, the conductive carbon particles contained in the intermediate transfer belt may be only one type or two or more types.

In the intermediate transfer belt that is a single layer body, from the viewpoints of strength securing, volume resistivity adjustment, and the like, the content of the conductive carbon particles in the single layer body is, for example, preferably 8% by mass or more and 45% by mass or less, more preferably 10% by mass or more and 38% by mass or less, and still more preferably 13% by mass or more and 30% by mass or less.

In the intermediate transfer belt that is a laminate, from the viewpoints of strength securing, volume resistivity adjustment, and the like, the content of the conductive carbon particles in the surface layer is, for example, preferably 8% by mass or more and 45% by mass or less, more preferably 10% by mass or more and 38% by mass or less, and still more preferably 13% by mass or more and 30% by mass or less.

In the intermediate transfer belt that is a laminate, from the viewpoint of dispersibility, mechanical strength and volume resistivity adjustment, the content of the second conductive carbon particles in the substrate layer is, for example, preferably 5% by mass or more and 40% by mass or less, more preferably 10% by mass or more and 30% by mass or less, and still more preferably 20% by mass or more and 30% by mass or less.

Alkyl Silicone Oil and Modified Body Thereof

The alkyl silicone oil and a modified body thereof included in the intermediate transfer belt according to the present exemplary embodiment refer to an oil having a siloxane bond and having an alkyl group, and a modified body of such oil. Specific examples of the alkyl silicone oil and a modified body thereof include dimethyl silicone oil and a modified body thereof.

The modified body of the dimethyl silicone oil refers to a compound in which at least part of methyl groups in the dimethyl silicone oil are substituted with an organic group.

The organic group contained in the modified body of the dimethyl silicone oil is not particularly limited as long as the organic group is a group having a carbon atom. Examples of the organic group include a polyether group, a polyol group, a polyester group, an acrylic group, a fatty acid ester group, a phenyl group, a fluoro group, an alkyl group, an aralkyl group, and the like.

Among these, from the viewpoint of improving the mold releasability on the outer peripheral surface of the intermediate transfer belt, for example, a polyether group is preferable.

Specifically, the modified body of the dimethyl silicone oil is, for example, preferably a polyether-modified dimethyl silicone oil.

In addition, the modified body of the dimethyl silicone oil may be a side chain-type modified silicone oil in which an organic group is bonded as a side chain of the dimethyl silicone oil, a one terminal type modified silicone oil in which an organic group is bonded to one terminal of the dimethyl silicone oil, a both terminal-type modified silicone oil in which an organic group is bonded to both terminals of the dimethyl silicone oil, or a side chain both terminal modified silicone oil in which an organic group is bonded as a side chain and bonded to both terminals of the dimethyl polysiloxane.

The viscosity (kinematic viscosity) of the alkyl silicone oil and a modified body thereof at 25° C. is not particularly limited, and examples thereof include 1 $mm^2/s$ or more and 100 $mm^2/s$ or less, and from the viewpoint of uniform dispersion, the viscosity is, for example, preferably 10 $mm^2/s$ or more and 50 $mm^2/s$ or less.

The viscosity of the alkyl silicone oil and a modified body thereof is measured using a B-8L type viscometer manufactured by TOKYO KEIKI INC.

In the intermediate transfer belt that is a single layer body, the content of the alkyl silicone oil and a modified body thereof in the single layer body is, for example, preferably 1% by mass or more and 7% by mass or less and more preferably 3% by mass or more and 5% by mass or less.

In the intermediate transfer belt that is a laminate, the content of the alkyl silicone oil and a modified body thereof in the surface layer is, for example, preferably 1% by mass or more and 7% by mass or less and more preferably 3% by mass or more and 5% by mass or less.

In the intermediate transfer belt that is a laminate, the content of the alkyl silicone oil and a modified body thereof in the substrate layer is not particularly limited, and may be smaller than the content of the alkyl silicone oil and a modified body thereof in the surface layer, or may be 0.

Other Components

The intermediate transfer belt according to the present exemplary embodiment may contain other components in addition to the resin, the conductive carbon particles, and the alkyl silicone oil and the modified body thereof.

Examples of the other components include a conducting agent other than the conductive carbon particles, a silicone oil other than the alkyl silicone oil and a modified body thereof, a filler for improving the strength of the belt, an antioxidant for preventing thermal deterioration of the belt, a surfactant for improving fluidity, a heat-resistant antioxidant, and the like.

Characteristics of Intermediate Transfer Belt

Thickness of Intermediate Transfer Belt

From the viewpoint of mechanical strength of the belt, the thickness of the intermediate transfer belt is, for example, preferably 60 μm or more and 120 μm or less, and more preferably 80 μm or more and 120 μm or less.

The film thickness of each layer is measured as follows.

That is, a cross section of the intermediate transfer belt taken along the thickness direction is observed with an optical microscope or a scanning electron microscope, the thickness of a layer as a measurement target is measured at 10 sites, and the average thereof is adopted as the thickness.

Volume Resistivity of Intermediate Transfer Belt

From the viewpoint of improving transferability, the common logarithm of the volume resistivity that the intermediate transfer belt has in a case where a voltage of 500 V is applied thereto for 10 seconds is, for example, preferably 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Manufacturing Method of Intermediate Transfer Belt

The manufacturing method of the intermediate transfer belt according to the present exemplary embodiment is not particularly limited as long as the manufacturing method is a method capable of manufacturing an outer peripheral surface having the above-described configuration.

An example of a manufacturing method of the intermediate transfer belt includes a method including a coating liquid-preparing step of preparing a coating liquid containing a resin or a precursor thereof, conductive carbon particles, an alkyl silicone oil, and a solvent, a coating film forming step of applying the coating liquid onto an outer periphery of a material as a coating target by a spiral coating method to form a coating film, and a drying step of drying the coating film while raising a temperature of the coated material.

By this method, the intermediate transfer belt according to the present exemplary embodiment, which is a single layer body, is obtained.

The manufacturing method of the intermediate transfer belt may go through other steps, in addition to the coating liquid-preparing step, the coating film forming step, and the drying step. Examples of the other steps include a baking step of baking the coating film dried by the drying step in a case where a precursor of a resin is used, and the like.

Coating Liquid-Preparing Step

In the coating liquid-preparing step, a coating liquid containing the resin or a precursor thereof, the conductive carbon particles, the alkyl silicone oil, and the solvent is prepared.

For example, in a case where the resin is a polyimide resin and the conductive carbon particles are carbon black, as the coating liquid, for example, a coating liquid in which carbon black is dispersed and polyamic acid which is a precursor of the polyimide resin and an alkyl silicone oil are dissolved in a solvent is prepared.

As a method of preparing the coating liquid, from the viewpoint of pulverizing aggregates of the conductive carbon particles and from the viewpoint of improving the dispersibility of the conductive carbon particles, for example, a dispersion treatment by using a pulverizer such as a ball mill or a jet mill is preferably performed.

In addition, in the coating liquid-preparing step, from the viewpoint of improving dispersibility of the conductive carbon particles, for example, it is preferable to add the alkyl silicone oil to the solvent containing the dispersed conductive carbon particles after the dispersion treatment is performed on the conductive carbon particles.

The solvent is not particularly limited and may be appropriately determined depending on the type of resin used as the resin, and the like. For example, in a case where the resin is a polyimide resin or a polyamide-imide resin, for example, a polar solvent that will be described later is preferably used as the solvent.

Examples of the polar solvent include N-methyl-2-pyrrolidone (NMP), N,N-dimethylformamide (DMF), N,N-dimethylacetamide (DMAc), N,N-diethylacetamide (DEAc), dimethyl sulfoxide (DMSO), hexamethylene phosphoramide (HMPA), N-methylcaprolactam, N-acetyl-2-pyrrolidone, 1,3-dimethyl-2-imidazolidone (N,N-dimethylimidazolidione, DMI) and the like. Each of these solvents may be used alone, or two or more of these solvents may be used in combination.

Coating Film-Forming Step

In the coating film-forming step, the coating film is formed by coating the outer periphery of the material as a coating target with the coating liquid by a spiral coating method.

Examples of the material as a coating target include a cylindrical or columnar mold, and the like. The material as a coating target may be the aforementioned mold with an outer peripheral surface treated with a release agent.

A spiral coating (flow coating) method is used as a coating method of the coating liquid.

The spiral coating method is carried out, for example, as follows.

First, the material as a coating target is rotated about an axis in a direction horizontally along a rotation axial direction of the material as a coating target. The coating liquid is discharged from a discharge portion of the dispenser onto an outer peripheral surface of the material as a coating target that is being rotated, and applied to the outer peripheral surface of the material as a coating target. In this case, the coating is performed while moving the discharge portion of the dispenser from one end to the other end of the rotational axial direction of the rotating material as a coating target, and thus the coating liquid is applied (coated) in a spiral shape onto the outer peripheral surface of the material as a coating target and the coating film is formed.

Here, by adjusting the coating conditions in the spiral coating method, specifically, the rotation speed of the material as a coating target and the moving speed of the discharge portion of the dispenser, the peak-to-peak distance in the increasing/decreasing period of the silicon amount can be controlled on the outer peripheral surface of the intermediate transfer belt.

Drying Step

In the drying step, the coating film formed in the coating film forming step is dried. In the drying step, the solvent contained in the coating film is removed to obtain a layer.

Examples of the method of drying the coating film include a method of supplying hot air to the coating film, a method of heating the material as a coating target, and the like.

Baking Step

As described above, the manufacturing method of the intermediate transfer belt may include a baking step. In the baking step, the coating film dried in the drying step is heated to be baked. For example, in a case where the resin is a polyimide resin, the polyamic acid contained in the coating film is imidized by the baking step to obtain a polyimide.

The heating temperature in the baking step is, for example, in a range of 150° C. or higher and 450° C. or lower, and preferably in a range of 200° C. or higher and 430° C. or lower. The heating time in the baking step is, for example, in a range of 20 minutes or more and 180 minutes or less, and preferably in a range of 60 minutes or more and 150 minutes or less.

In a case of the intermediate transfer belt that is a multilayer body, the intermediate transfer belt according to the present exemplary embodiment can be obtained by forming a substrate layer on a surface of the material as a coating target by a known method, and forming a surface layer on a surface of the substrate layer by the above-described method (a method including the coating liquid-preparing step, the coating film forming step, and the drying step).

In addition, in a case of the intermediate transfer belt that is a multilayer body, the intermediate transfer belt according to the present exemplary embodiment can be obtained by forming a substrate layer on a surface of the material as a coating target by a known method, forming a surface layer containing a resin, conductive carbon particles, and an alkyl silicone oil on a surface of the substrate layer by a known method, and then removing a part of the surface layer along the circumferential direction to form a plurality of grooves arranged in parallel or substantially parallel to an axial direction of the belt.

Transfer Device

The transfer device according to the present exemplary embodiment is a transfer device including the intermediate transfer belt according to the present exemplary embodiment, a blade that is brought into contact with an outer peripheral surface of the intermediate transfer belt and cleans the outer peripheral surface, a primary transfer device that has a primary transfer member primarily transferring a toner image formed on a surface of an image holder to the outer peripheral surface of the intermediate transfer belt, and a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

Blade

A blade is brought into contact with an outer peripheral surface of the intermediate transfer belt to clean the outer peripheral surface, The blade cleans toner (also referred to as residual toner) or the like, remaining on the outer peripheral surface of the intermediate transfer belt after the toner image transferred to the outer peripheral surface of the intermediate transfer belt is secondarily transferred to the surface of the recording medium.

The blade is used, for example, by being supported by a rigid plate-like support member.

Examples of the blade include a known blade applied to cleaning of the intermediate transfer belt. Among these, for example, the blade is preferably a blade made of a rubber such as a polyurethane rubber.

Here, the contact condition of the blade with the intermediate transfer belt will be described with reference to FIG. 1.

FIG. 1 is a schematic view for describing contact conditions between the intermediate transfer belt and the blade. Here, in FIG. 1, BE represents an intermediate transfer belt, CB represents a blade, and CBS represents a support member that supports the blade.

From the viewpoint of obtaining excellent cleanliness, a pressing force NF shown in FIG. 1 that is for pressing the blade CB on the intermediate transfer belt BE is, for example, preferably 1 N·m or more and 6 N·m or less and more preferably 1.5 N·m or more and 5 N m or less.

The intrusion d of the blade CB into the intermediate transfer belt BE is, for example, preferably 0.5 mm or more and 2.0 mm or less and more preferably 0.6 mm or more and 1.8 mm or less.

Furthermore, an angle WA (working angle) at the contact portion between the intermediate transfer belt BE and the blade CB is, for example, preferably 5° or more and 30° or less and more preferably 10° or more and 20° or less.

The pressing force NF of the blade is calculated by the following expression.

Expression: Pressing force $NF=k\times d$

In the expression, k represents a spring constant unique to the blade, and d represents an intrusion of the blade into the intermediate transfer belt (see FIG. 1).

The spring constant k unique to the blade is obtained by causing displacement of the cleaning blade and measuring the load with a load cell.

The intrusion d of the blade into the belt is determined by calculating the amount of displacement of the intermediate transfer belt caused in a case where the blade fixed to the support member is brought into contact with the intermediate transfer belt.

Primary Transfer Device

The primary transfer device is a device a primary transfer roll made of a metal that applies an electric field to an intermediate transfer belt by coming into contact with an inner peripheral surface of the intermediate transfer belt, and performs primary transfer of a toner image formed on a surface of an image holder to the outer peripheral surface of the intermediate transfer belt.

The primary transfer roll made of a metal is arranged to face the image holder across the intermediate transfer belt. In the primary transfer device, the toner image is primarily transferred to the outer peripheral surface of the intermediate transfer belt by applying a voltage of a polarity opposite to the charging polarity of the toner to the intermediate transfer belt by the primary transfer roll made of a metal.

Examples of the primary transfer roll include a metal member such as iron, copper, brass, stainless steel (SUS), sulfur composite steel (SUM), aluminum, or nickel. The primary transfer roll may be a hollow metal roll or a solid metal roll.

The outer diameter of the primary transfer roll is, for example, in a range of 4 mm or more and 28 mm or less.

The circumferential width of the nip region where the intermediate transfer belt is interposed between the primary transfer roll and the image holder is, for example, in a range of 0.5 mm or more and 5 mm or less.

Secondary Transfer Device

The secondary transfer device is a device that performs secondary transfer of the toner image transferred to the outer peripheral surface of the intermediate transfer belt to a surface of a recording medium.

The secondary transfer device includes, for example, a secondary transfer roll which is arranged on the outer peripheral surface side of the intermediate transfer belt, that is, the side on which the toner image is held, and a back roll which is arranged on the inner peripheral surface side of the intermediate transfer belt, that is, the side opposite to the side on which the toner image is held. In the secondary transfer device, the intermediate transfer belt and the recording medium are interposed between the secondary transfer roll and the back roll to form a transfer electric field. In this way, secondary transfer of the toner image formed on the intermediate transfer belt to the recording medium is performed.

Image Forming Apparatus

The image forming apparatus according to the present exemplary embodiment includes an image holder, a charging device that charges a surface of the image holder, an electrostatic latent image forming device that forms an electrostatic latent image on the charged surface of the image holder, a developing device that accommodates a developer containing a toner and develops the electrostatic latent image formed on the surface of the image holder with the developer to form a toner image, and the transfer device according to the present exemplary embodiment.

As the image forming apparatus according to the present exemplary embodiment, known image forming apparatuses are used which include an apparatus including a fixing unit that fixes a toner image transferred to the surface of a recording medium; an apparatus including a cleaning unit that cleans the surface of an image holder not yet being charged after transfer of a toner image; an apparatus including an electricity removing unit that removes electricity by irradiating the surface of an image holder, the image holder not yet being charged, with electricity removing light after transfer of a toner image; an apparatus including an image holder heating member that raises the temperature of an image holder to reduce relative temperature, and the like.

In the image forming apparatus according to the present exemplary embodiment, for example, a portion including the image holder may be a cartridge structure (process cartridge) detachable from the image forming apparatus.

Hereinafter, an example of the image forming apparatus according to the present exemplary embodiment will be described with reference to drawings. Here, the image forming apparatus according to the present exemplary embodiment is not limited thereto. Main parts shown in the figures will be described, but description of other parts will not be provided.

Figure 2:
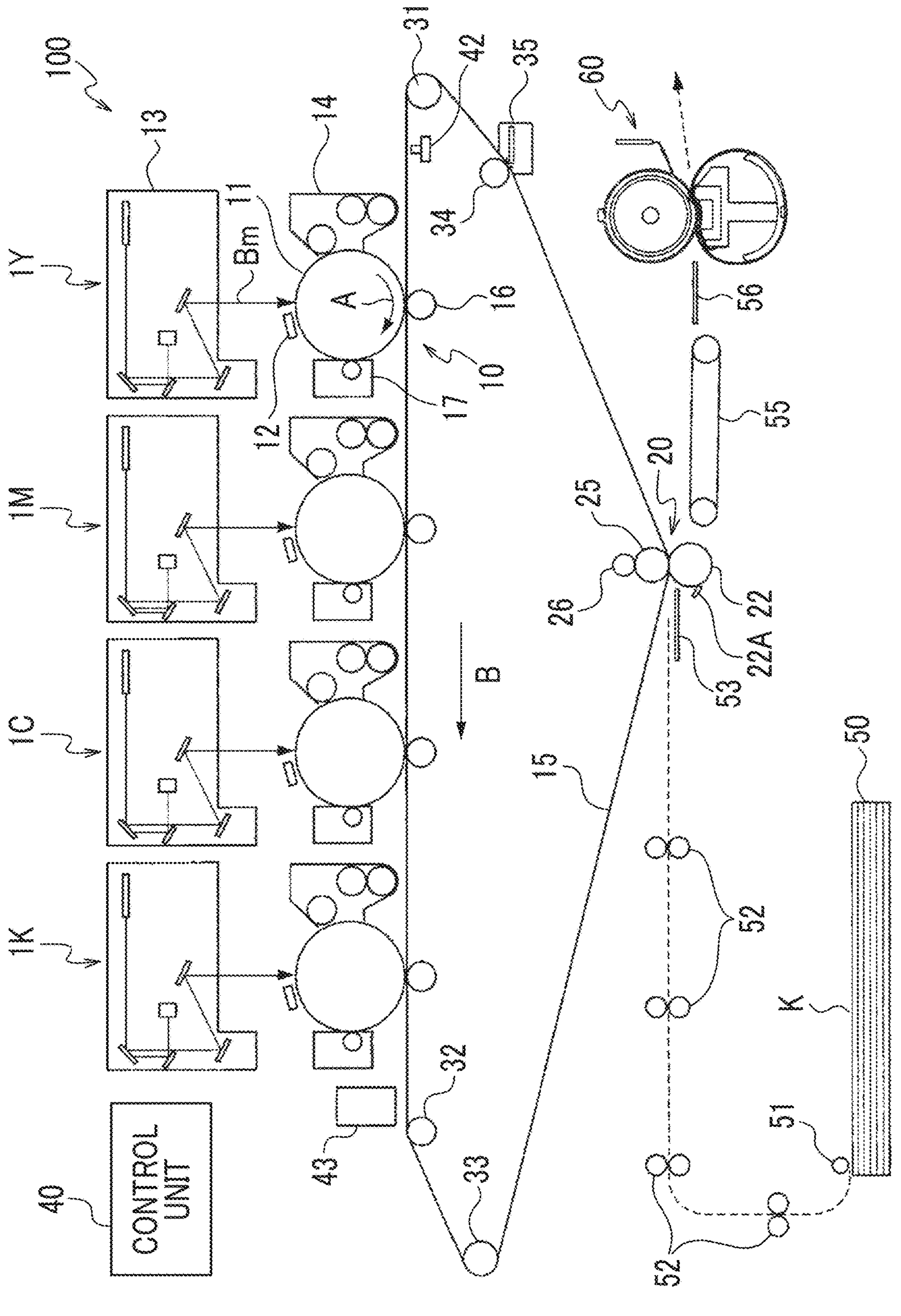
FIG. 2 is a schematic configuration view showing an example of an image forming apparatus according to the present exemplary embodiment.

FIG. 2 is a schematic configuration view showing the configuration of the image forming apparatus according to the present exemplary embodiment.

As shown in FIG. 2, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control unit 40 that controls the operation of each device (each portion). As the intermediate transfer belt 15, the intermediate transfer belt according to the present exemplary embodiment is used.

Each of the image forming units 1Y, 1M, 1C, and 1K of the image forming apparatus 100 includes a photoreceptor 11 that holds the toner image formed on the surface thereof and rotates in the direction of an arrow A.

Around the photoreceptor 11, there are provided a charger 12 for charging the photoreceptor 11 as an example of a charging device and a laser exposure machine 13 for drawing an electrostatic latent image on the photoreceptor 11 as an example of an electrostatic latent image forming device (in Figure, the exposure beam is represented by a mark Bm).

Around the photoreceptor 11, as an example of a developing device, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly disposed in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 2 at a speed fit for the purpose. As the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided to face a cleaning blade for an intermediate transfer belt 35 that is brought into contact with the outer peripheral surface of the intermediate transfer belt 15 to clean the outer peripheral surface are provided.

The primary transfer portion 10 is configured with the primary transfer roll 16 that is arranged to face the photoreceptor 11 across the intermediate transfer belt 15. Then, the primary transfer roll 16 is arranged to be pressed on the photoreceptor 11 with the intermediate transfer belt 15 interposed therebetween, and is configured such that a voltage (primary transfer bias) with an opposite polarity to a charging polarity (minus polarity and the same applies below) of the toner is applied to the primary transfer roll 16. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 is configured to include the back roll 25 and a secondary transfer roll 22 that is arranged on a toner image-holding surface side of the intermediate transfer belt 15.

The back roll 25 is formed such that the surface resistivity thereof is $1\times10^{7}\Omega/\square$ or more and $1\times10^{10}\Omega/\square$ or less. The hardness of the back roll 25 is set to, for example, 700 (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ω·cm or more and $10^{8.5}$ Ω·cm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, the cleaning blade for an intermediate transfer belt 35 separable from the intermediate transfer belt 15 is provided which removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The image forming apparatus 100 may have a configuration in which the apparatus includes a secondary transfer belt (an example of a secondary transfer member) instead of the secondary transfer roll 22.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control unit 40 based on the recognition of the reference signal.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing inlet guide 56 that guides the paper K to the fixing device 60.

Next, by using the image forming apparatus shown in FIG. 2, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, so that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an output portion of the image forming apparatus.

On the other hand, after the transfer to the paper K is finished, the residual toner and the like remaining on the intermediate transfer belt 15 is transported to the cleaning blade for an intermediate transfer belt 35 as the intermediate transfer belt 15 rotates, and is removed from the intermediate transfer belt 15 by the cleaning blade for an intermediate transfer belt 35.

Hitherto, the present exemplary embodiment has been described. However, the present exemplary embodiment is not limited to the above exemplary embodiments, and various modifications, changes, and ameliorations can be added thereto.

EXAMPLES

Examples of the present invention will be described below, but the present invention is not limited to the following examples. In the following description, all "parts" and "%" are in terms of mass unless otherwise specified.

Example 1

Production of Coating Liquid A

A mixture obtained by adding 39.6 g (22 phr) of oxidized gas black (channel black, manufactured by Orion Engineered Carbons S.A., FW200, number-average primary particle size: 13 nm) as conductive carbon particles to 1,000 g of fully aromatic polyimide varnish (solid content: 18% by mass, manufactured by UNITIKA LTD., U-IMIDE KX, solvent: NMP) is passed through an φ0.1 mm orifice of a high-pressure collision disperser (manufactured by Genus) under a pressure of 200 MPa, and the slurry divided into two portions dispersed by are dispersed by being caused to collide with each other 20 times, thereby obtaining a dispersion liquid. 5.0 g of a polyether-modified dimethyl silicone oil (manufactured by Shin-Etsu Chemical Co., Ltd., trade name: KP-126, viscosity at 25° C.: 10 $mm^2/s$) as an alkyl silicone oil is added to the obtained dispersion liquid and the mixture is stirred to obtain a coating liquid A.

Production of Belt A1

Preparation of Material as Coating Target

A cylindrical mold made of SUS material having an outer diameter of 278 mm and a length of 400 mm is prepared. The outer peripheral surface of the mold is coated with a silicone-based release agent (manufactured by Shin-Etsu Chemical Co., Ltd., trade name: SEPACOAT SP) and subjected to a drying treatment (treated with a release agent).

The cylindrical mold after the mold release agent treatment is used as a material as a coating target.

Formation of Coating Film

In a state where the cylindrical mold (the material as a coating target) treated with a release agent is being rotated in the circumferential direction at a speed of 42 rpm, the coating liquid A is discharged thereto from a dispenser having a diameter of 1.0 mm such that the cylindrical mold is coated from the end portion, and a metal blade installed on the mold is pressed on the mold with a uniform pressure such that the mold is coated. The dispenser unit is moved in the axial direction of the cylindrical mold at a speed of 200 mm/min such that the coating liquid A1 is spirally applied to the cylindrical mold, thereby forming a coating film.

Drying of Coating Film

Then, the mold and the coating film are subjected to a drying treatment for 15 minutes by being rotated at 10 rpm in a drying furnace in an air atmosphere at 140° C.

The solvent volatilizes from the coating film after drying, which changes the coating film to a polyamic acid resin-molded product having self-supporting properties.

Baking

Next, the polyamic acid resin molded product is placed in an oven in which a reaching temperature is set to 320° C. for 4 hours to obtain a single-layer type intermediate transfer belt A1. A film thickness of the intermediate transfer belt A1 is 80 μm.

Examples 2 to 7

Intermediate transfer belts A2 to A7 are obtained in the same manner as in Example 1, except that, in the formation of the coating film, the rotation speed of the cylindrical mold and the moving speed of the dispenser are changed as shown in Table 1 below.

Example 8

An intermediate transfer belt B1 is obtained in the same manner as in Example 1, except that a coating liquid B in which the amount of the alkyl silicone oil in the coating liquid A is changed to 3.0 g is used.

Example 9

An intermediate transfer belt C1 is obtained in the same manner as in Example 1, except that a coating liquid C1 in which the alkyl silicone oil in the coating liquid A is changed to a polyether-modified dimethyl silicone oil (manufactured by Shin-Etsu Chemical Co., Ltd., trade name: KP-109, viscosity at 25° C.: 10 $mm^2/s$) is used.

Example 10

An intermediate transfer belt C2 is obtained in the same manner as in Example 1, except that a coating liquid C2 in which the alkyl silicone oil in the coating liquid A is changed to dimethyl silicone oil (manufactured by Shin-Etsu Chemical Co., Ltd., trade name: KF-96, viscosity at 25° C.: 10 $mm^2/s$) is used.

Comparative Example 1

The intermediate transfer belt loaded in Apeos C8180 (manufactured by FUJIFILM Business Innovation Corp.) is taken out, and cut and processed into a shape that can be attached to Apeos C7070, thereby obtaining an intermediate transfer belt C1.

Comparative Examples 2 and 3

Intermediate transfer belts C2 and C3 are obtained in the same manner as in Example 1, except that, in the formation of the coating film, the rotation speed of the cylindrical mold and the moving speed of the dispenser are changed as shown in Table 1 below.

Measurement of Intermediate Transfer Belt

For each obtained intermediate transfer belt, the silicon amount (atomic %) on the outer peripheral surface is measured along the axial direction using the X-ray photoelectron spectroscopy method in the same manner as described above.

As a result, whether or not the silicon amount increases and decreases periodically along the axial direction, the peak-to-peak distance in the increasing/decreasing period of the silicon amount, and the difference between the peak top and the peak bottom in the increasing/decreasing period of the silicon amount are determined.

Furthermore, in the above-described method, a difference between the surface resistivity at the peak top portion and the surface resistivity at the peak bottom portion in the increasing/decreasing period of the silicon amount is obtained.

The results are shown in Table 1.

In Table 1, a case where the silicon amount increases and decreases periodically along the axial direction is indicated as "Y", and a case where the silicon amount does not increase and decrease periodically along the axial direction is indicated as "N".

Manufacturing of Transfer Device and Image Forming Apparatus

An image forming apparatus including a transfer device is obtained by attaching the intermediate transfer belt obtained in each example and the following blade into a transfer device Apeos C7070 (manufactured by FUJIFILM Business Innovation Corp.).

As the blade, a rubber blade having a free length of 8.0 mm, a width of 334 mm, and a thickness of 1.9 mm made of polyurethane rubber, which is attached to a metal holder, is used.

In addition, as a contact condition between the intermediate transfer belt and the blade, a pressing force NF (Normal Force) is set to 2.7 gf/mm and an angle W/A is set to 18°.

By using the image forming apparatus, the following evaluation is performed.

Evaluation

1. Evaluation of Curling of Blade

Using the obtained image forming apparatus, 1,000 sheets of white paper having an A4 size are continuously printed in an atmosphere of 28° C. and 85 RH %, and the curling of the blade is evaluated.

Evaluation Standard

G1: the blade curling does not occur.

G2: streaks occur on the print due to the blade curling.

G3: the image forming apparatus is intermittently stopped during continuous printing due to the blade curling.

G4: printing operation cannot be performed due to the blade curling.

2. Evaluation of Transfer Efficiency

An image of a solid black 100% band chart is output by the obtained image forming apparatus, a hard stop is performed in the secondary transfer step, the toner weight a (toner weight before secondary transfer) on the outer peripheral surface of the intermediate transfer belt is measured, and furthermore, the toner weight b transferred onto the paper is measured.

Therefore, the transfer efficiency is obtained by the following expression.

$$\text{Transfer efficiency}[\%]=b/a\times100$$

Evaluation Standard

G1: transfer efficiency is 95% or more.

G2: transfer efficiency is 90% or more and less than 95%.

G3: transfer efficiency is less than 90%.

3. Evaluation of Cleanliness 1,000 sheets of charts of the full-surface lattice having a density equivalent to 1% on A4 size ordinary paper in a surrounding environment of 28° C. and 85 RH % is output using the obtained image forming apparatus, and then the degree of occurrence of streak-like cleaning defect after 100% of the solid is caused to enter the contact portion between the intermediate transfer belt and the blade in a state where the solid is not transferred is evaluated.

Evaluation Standard

G1: cleaning defect does not occur.

G2: cleaning defect is not visually recognized.

G3: cleaning defect is clearly visible.

TABLE 1

| | | Intermediate transfer belt | | | | | | | | | |
|---|---|---|---|---|---|---|---|---|---|---|---|
| | | | Conditions of spiral coating | | Physical properties of outer peripheral surface | | | | Evaluation | | |
| | No. | Coating liquid No. | Rotation speed [rpm] | Moving speed of discharge portion [mm/minute] | Whether silicon amount increases and decreases periodically along axial direction | Peak-to-peak distance [mm] | Difference between peak top and peak bottom [atomic %] | Difference between surface resistivity of peak top portion and surface resistivity of peak bottom portion [log/□] | Curling of blade | Transfer efficiency | Cleanliness |
| Example 1 | A1 | A | 42 | 200 | Y | 2.6 | 3.0 | 0.01 | G1 | G1 | G1 |
| Example 2 | A2 | A | 42 | 250 | Y | 3.5 | 3.5 | 0.02 | G1 | G2 | G2 |
| Example 3 | A3 | A | 22 | 130 | Y | 4.0 | 5.2 | 0.02 | G2 | G1 | G2 |
| Example 4 | A4 | A | 81 | 420 | Y | 3.5 | 0.05 | 0.01 | G2 | G1 | G2 |
| Example 5 | A5 | A | 13 | 90 | Y | 3.5 | 6.0 | 0.02 | G1 | G2 | G2 |
| Example 6 | A6 | A | 63 | 315 | Y | 2.6 | 3.0 | 0.04 | G2 | G2 | G2 |
| Example 7 | A7 | A | 63 | 355 | Y | 3.5 | 3.5 | 0.03 | G1 | G2 | G1 |
| Example 8 | B1 | B | 42 | 200 | Y | 2.6 | 3.0 | 0.01 | G1 | G2 | G1 |
| Example 9 | C1 | C1 | 42 | 200 | Y | 2.6 | 3.0 | 0.01 | G1 | G2 | G1 |
| Example 10 | C2 | C2 | 42 | 200 | Y | 2.6 | 3.0 | 0.01 | G1 | G2 | G1 |
| Comparative Example 1 | D1 | — | — | — | N | — | — | — | G4 | G4 | G3 |
| Comparative Example 2 | D2 | A | 42 | 90 | Y | 0.05 | 9.0 | 0.07 | G3 | G4 | G3 |
| Comparative Example 3 | D3 | A | 13 | 405 | Y | 8.0 | 0.05 | 0.04 | G4 | G3 | G3 |

From the results shown in Table 1, in the intermediate transfer belt of the present examples, the curling of the blade can be seen to be suppressed.

Hereinafter, aspects in the present disclosure and effects thereof will be described.

(((1))) An intermediate transfer belt comprising:

a resin;

conductive carbon particles; and an alkyl silicone oil and a modified body thereof, wherein regions different in a content of the alkyl silicone oil and the modified body thereof are formed on an outer peripheral surface, in a case where a silicon amount (Atomic %) on the outer peripheral surface is measured along an axial direction using an X-ray photoelectron spectroscopy, the silicon amount is periodically increased and decreased along the axial direction, and a peak-to-peak distance in an increasing/decreasing period of the silicon amount is 0.1 mm or more and 5.0 mm or less.

(((2))) The intermediate transfer belt according to (((1))), wherein the peak-to-peak distance is 0.1 mm or more and 3.0 mm or less.

(((3))) The intermediate transfer belt according to (((1))) or (((2))), wherein a difference between a peak top and a peak bottom in the increasing/decreasing period of the silicon amount is 0.1 Atomic % or more and 5.0 Atomic % or less.

(((4))) The intermediate transfer belt according to (((1))), wherein the peak-to-peak distance is 0.1 mm or more and 3.0 mm or less, and a difference between a peak top and a peak bottom in the increasing/decreasing period of the silicon amount is 0.1 Atomic % or more and 5.0 Atomic % or less.

(((5))) The intermediate transfer belt according to any one of (((1))) to (((4))), wherein a difference between a surface resistivity at a peak top portion and a surface resistivity at a peak bottom portion in the increasing/decreasing period of the silicon amount is 0.03 log Ω/□ or less.

(((6))) The intermediate transfer belt according to (((5))), wherein the difference between the surface resistivity at the peak top portion and the surface resistivity at the peak bottom portion in the increasing/decreasing period of the silicon amount is 0.02 log Ω/□ or less.

(((7))) A transfer device comprising:

the intermediate transfer belt according to any one of (((1))) to (((6)));

a blade that is brought into contact with an outer peripheral surface of the intermediate transfer belt and cleans the outer peripheral surface;

a primary transfer device that has a primary transfer member primarily transferring a toner image formed on a surface of an image holder to the outer peripheral surface of the intermediate transfer belt; and a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

(((8))) An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image; and the transfer device according to (((7))), which transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An intermediate transfer belt comprising:
a resin;
conductive carbon particles; and
an alkyl silicone oil and a modified body thereof,
wherein regions different in a content of the alkyl silicone oil and the modified body thereof are formed on an outer peripheral surface,
in a case where a silicon amount (Atomic %) on the outer peripheral surface is measured along an axial direction using an X-ray photoelectron spectroscopy, the silicon amount is periodically increased and decreased along the axial direction, and
a peak-to-peak distance in an increasing/decreasing period of the silicon amount is 0.1 mm or more and 5.0 mm or less.

2. The intermediate transfer belt according to claim 1,
wherein the peak-to-peak distance is 0.1 mm or more and 3.0 mm or less.

3. A transfer device comprising:
the intermediate transfer belt according to claim 2;
a blade that is brought into contact with an outer peripheral surface of the intermediate transfer belt and cleans the outer peripheral surface;
a primary transfer device that has a primary transfer member primarily transferring a toner image formed on a surface of an image holder to the outer peripheral surface of the intermediate transfer belt; and
a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

4. An image forming apparatus comprising:
an image holder;
a charging device that charges a surface of the image holder;
an electrostatic latent image forming device that forms an electrostatic latent image on the charged surface of the image holder;
a developing device that accommodates a developer containing a toner and develops the electrostatic latent image formed on the surface of the image holder with the developer to form a toner image; and
the transfer device according to claim 3 that transfers the toner image to a surface of a recording medium.

5. The intermediate transfer belt according to claim 1,
wherein a difference between a peak top and a peak bottom in the increasing/decreasing period of the silicon amount is 0.1 Atomic % or more and 5.0 Atomic % or less.

6. A transfer device comprising:
the intermediate transfer belt according to claim 5;
a blade that is brought into contact with an outer peripheral surface of the intermediate transfer belt and cleans the outer peripheral surface;
a primary transfer device that has a primary transfer member primarily transferring a toner image formed on a surface of an image holder to the outer peripheral surface of the intermediate transfer belt; and
a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

7. An image forming apparatus comprising:
an image holder;
a charging device that charges a surface of the image holder;
an electrostatic latent image forming device that forms an electrostatic latent image on the charged surface of the image holder;
a developing device that accommodates a developer containing a toner and develops the electrostatic latent image formed on the surface of the image holder with the developer to form a toner image; and
the transfer device according to claim 6 that transfers the toner image to a surface of a recording medium.

8. The intermediate transfer belt according to claim 1,
wherein the peak-to-peak distance is 0.1 mm or more and 3.0 mm or less, and
a difference between a peak top and a peak bottom in the increasing/decreasing period of the silicon amount is 0.1 Atomic % or more and 5.0 Atomic % or less.

9. A transfer device comprising:
the intermediate transfer belt according to claim 8;
a blade that is brought into contact with an outer peripheral surface of the intermediate transfer belt and cleans the outer peripheral surface;
a primary transfer device that has a primary transfer member primarily transferring a toner image formed on a surface of an image holder to the outer peripheral surface of the intermediate transfer belt; and
a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

10. An image forming apparatus comprising:
an image holder;
a charging device that charges a surface of the image holder;
an electrostatic latent image forming device that forms an electrostatic latent image on the charged surface of the image holder;
a developing device that accommodates a developer containing a toner and develops the electrostatic latent image formed on the surface of the image holder with the developer to form a toner image; and
the transfer device according to claim 9, that transfers the toner image to a surface of a recording medium.

11. The intermediate transfer belt according to claim 1,
wherein a difference between a surface resistivity at a peak top portion and a surface resistivity at a peak bottom portion in the increasing/decreasing period of the silicon amount is 0.03 log Ω/□ or less.

12. The intermediate transfer belt according to claim 11,
wherein the difference between the surface resistivity at the peak top portion and the surface resistivity at the peak bottom portion in the increasing/decreasing period of the silicon amount is 0.02 log Ω/□ or less.

13. A transfer device comprising:

the intermediate transfer belt according to claim 12;

a blade that is brought into contact with an outer peripheral surface of the intermediate transfer belt and cleans the outer peripheral surface;

a primary transfer device that has a primary transfer member primarily transferring a toner image formed on a surface of an image holder to the outer peripheral surface of the intermediate transfer belt; and a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

14. An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image; and the transfer device according to claim 13, that transfers the toner image to a surface of a recording medium.

15. A transfer device comprising:

the intermediate transfer belt according to claim 11;

a blade that is brought into contact with an outer peripheral surface of the intermediate transfer belt and cleans the outer peripheral surface;

a primary transfer device that has a primary transfer member primarily transferring a toner image formed on a surface of an image holder to the outer peripheral surface of the intermediate transfer belt; and a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

16. An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image; and the transfer device according to claim 15, that transfers the toner image to a surface of a recording medium.

17. A transfer device comprising:

the intermediate transfer belt according to claim 1;

a blade that is brought into contact with an outer peripheral surface of the intermediate transfer belt and cleans the outer peripheral surface;

a primary transfer device that has a primary transfer member primarily transferring a toner image formed on a surface of an image holder to the outer peripheral surface of the intermediate transfer belt; and a secondary transfer device that has a secondary transfer member disposed in contact with the outer peripheral surface of the intermediate transfer belt and secondarily transferring the toner image transferred to the outer peripheral surface of the intermediate transfer belt to a surface of a recording medium.

18. An image forming apparatus comprising:

an image holder;

a charging device that charges a surface of the image holder;

an electrostatic latent image forming device that forms an electrostatic latent image on the charged surface of the image holder;

a developing device that accommodates a developer containing a toner and develops the electrostatic latent image formed on the surface of the image holder with the developer to form a toner image; and the transfer device according to claim 17 that transfers the toner image to a surface of a recording medium.

* * * * *